(12) United States Patent
Reese

(10) Patent No.: US 6,427,009 B1
(45) Date of Patent: *Jul. 30, 2002

(54) ENHANCED APPARATUS FOR USE WITH CALLER ID SYSTEM

(76) Inventor: Morris Reese, P.O. Box 6651, Thousand Oaks, CA (US) 91359

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/614,188

(22) Filed: Mar. 13, 1996

Related U.S. Application Data

(63) Continuation of application No. 08/093,603, filed on Jul. 19, 1993, now abandoned, which is a continuation of application No. 07/691,492, filed on Apr. 25, 1991, now abandoned, which is a continuation-in-part of application No. 07/460,381, filed on Jan. 3, 1990, now abandoned.

(51) Int. Cl.⁷ ................................................. H04M 1/57
(52) U.S. Cl. ............................. 379/215.01; 379/142.08; 379/355.09; 379/373.01
(58) Field of Search ........................... 379/215, 67, 88, 379/142, 199, 245, 246, 247, 142.01, 142.08, 142.07, 201.01, 210.01, 215.01, 355.02, 355.03, 355.05, 355.09, 373.01, 373.02, 376.01

(56) References Cited

U.S. PATENT DOCUMENTS 4,332,985 A * 6/1982 Samuel ........................ 379/353

(List continued on next page.)

FOREIGN PATENT DOCUMENTS

JP 0039154 * 3/1983

(List continued on next page.)

OTHER PUBLICATIONS

"A system in search of an advocate", C. R. Kraus, *IEEE Spectrum*, Jun. 1985, p. 8.*

(List continued on next page.)

Primary Examiner—Scott L. Weaver

(57) ABSTRACT

An apparatus and method are disclosed for accessing originating central office equipment to control the disclosure of a calling party directory telephone number and/or name (hereinafter sometimes referred to as "DN" or "directory telephone number with a corresponding name") to a called party who subscribes to Caller ID service or to any other Custom Local Area Switching System (hereinafter sometimes referred to as "CLASS") service which discloses the calling party DN to the called party by performing a desired one of a plurality of automatic and/or manual calling operations. The apparatus and method are also for receiving, displaying and storing to memory a calling party DN sent from terminating central office equipment via a voice channel of a called party busy or idle telephone line in response to the receipt of the calling party flagged "public" DN sent from originating central office equipment to which the calling party telephone line is connected. In furtherance, the apparatus and method disclosed permit recalling a stored DN from memory to be displayed in an LED or LCD display counter, and permit automatically dialing a stored DN to return a missed call. A method is also disclosed for sending to an apparatus at a called station during a silent interval of a ringing signal cycle or a call-waiting tone signal cycle an incoming caller DN sent from terminating central office equipment responsively to the receipt of the DN sent from originating central office equipment indicating that the DN is to be disclosed at the called station.

20 Claims, 4 Drawing Sheets

U.S. PATENT DOCUMENTS

| | | | | |
|---|---|---|---|---|
| 4,447,676 A | * | 5/1984 | Harris et al. | 379/199 |
| 4,551,581 A | | 11/1985 | Doughty | 379/94 |
| 4,567,323 A | * | 1/1986 | Lottes et al. | 379/201 |
| 4,582,956 A | | 4/1986 | Doughty | 379/94 |
| 4,723,273 A | * | 2/1988 | Diesel et al. | 379/211 |
| 4,759,056 A | * | 7/1988 | Akiyama | 379/197 |
| 4,788,720 A | * | 11/1988 | Brennan et al. | 379/201 |
| 4,873,719 A | * | 10/1989 | Reese | 379/215 |
| 4,894,861 A | * | 1/1990 | Fujioka | 379/374 |
| 4,922,490 A | * | 5/1990 | Blakley | 379/142 X |
| 4,924,496 A | * | 5/1990 | Figa et al. | 379/142 |
| 5,033,076 A | * | 7/1991 | Jones et al. | 379/67 |
| 5,054,052 A | * | 10/1991 | Nonami | 379/57 |
| 5,067,153 A | * | 11/1991 | Willie et al. | 380/23 |
| 5,121,423 A | * | 6/1992 | Morihiro et al. | 379/142 |
| 5,155,761 A | * | 10/1992 | Hammond | 379/67 |
| 5,189,634 A | | 2/1993 | Eberle et al. | 364/724.09 |
| 5,228,080 A | * | 7/1993 | Nutter et al. | 379/373 |
| 5,263,084 A | * | 11/1993 | Chaput et al. | 379/215 |
| 5,265,145 A | * | 11/1993 | Lim | 379/88 |

FOREIGN PATENT DOCUMENTS

| | | | | |
|---|---|---|---|---|
| JP | 58-39154 | * | 3/1983 | 379/215 |
| JP | 0059854 | * | 4/1985 | 379/142 |
| JP | 0070648 | * | 3/1988 | |
| JP | 0089846 | * | 4/1989 | 379/142 |
| JP | 0099356 | * | 4/1989 | 379/142 |
| JP | 0248747 | * | 10/1989 | |
| JP | 0251848 | * | 10/1989 | |
| JP | 1-253389 | * | 10/1989 | 379/215 |
| JP | 2-256358 | * | 10/1990 | 379/215 |

OTHER PUBLICATIONS

"CLASS Feature: Calling Number Delivery", Bellcore Tech. Ref. TR–TSY–000031, Issue 2, Jun. 1988.*

"Calling Number Delivery Blocking", Bellcore Tech. Ref. TR–TSY–000391, Jun. 1988.*

"Bell Atlantic's Caller I.D. Bid Sparks Criticism", *Wall Street Journal*, Mar. 9, 1989.*

"Caller ID", Bell Atlantic Brochure (1 page), Feb. 1990.*

Telephone Challenges: a Plethora of Services, IEEE Spectrum, Jul. 1990, Tekla S. Perry, pp. 25–28.*

Bellcore Technical Reference TR–TSY–000031, Issue 1, Jun. 1986, "Calling Number Delivery".

Bell Communications Research, "SPCS Customer Premises Equipment Data Interface", Technical Ref. No. TR–TSY–000030, issued Nov. 1988.

Daily News Article, "Keeping it Private", Jul. 11, 1989.

* cited by examiner

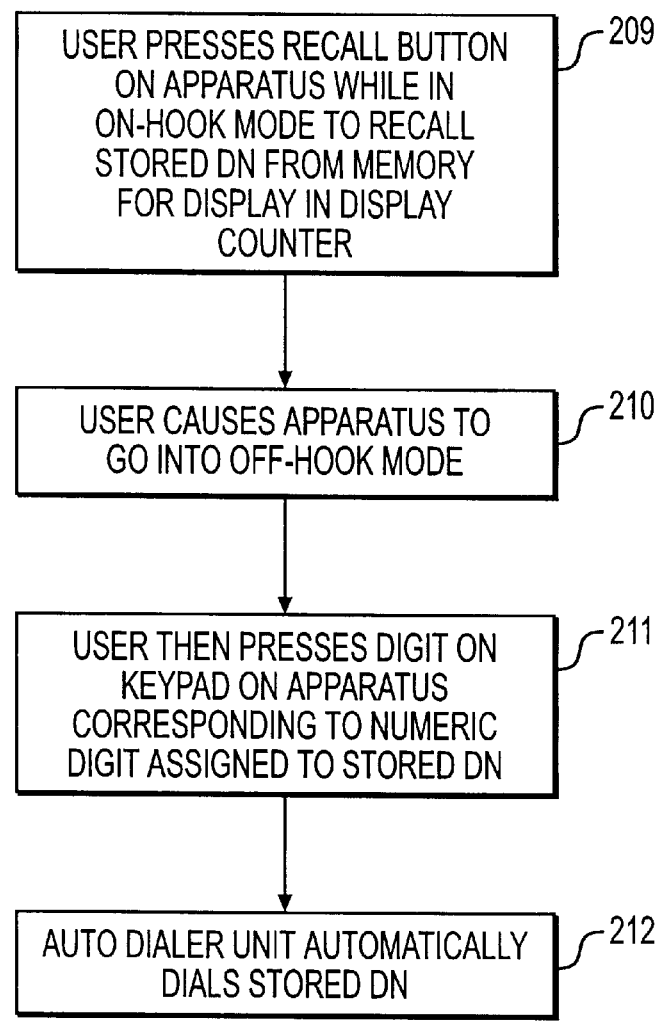

ENHANCED APPARATUS FOR USE WITH CALLER ID SYSTEM

This application is a continuation of Ser. No. 08/093,603, filed Jul. 19, 1993, which is a continuation of Ser. No. 07/691,492, filed Apr. 25, 1991, which is a continuation-in-part of Ser. No. 07/460,381, filed Jan. 3, 1990, now abandoned, all now abandoned.

BACKGROUND OF THE INVENTION

1. Field of the Invention

This invention relates to an apparatus, such as a pushbutton telephone or other receiving and sending equipment, for use in accessing telephone or cellular company originating central office equipment so as to allow a calling party to control the disclosure of its directory telephone number and/or name (hereinafter sometimes referred to as "DN" or "directory telephone number with a corresponding name") to a called party who subscribes to any of the Custom Local Area Signalling System (CLASS) services such as Caller ID, Automatic Recall, Who Called Me, Automatic Callback and Screening List, to name a few. The apparatus is also for use in receiving a DN sent from telephone or cellular company terminating central office equipment, displaying the received DN in a display counter and storing the received DN in memory for later recall by the called party, In furtherance, the apparatus is for use in permitting the automatic or manual dialing of the stored directory telephone number with a corresponding name to return a missed call. This invention also relates to a method for sending to a called station during a silent interval of a ringing signal cycle or a call-waiting tone signal cycle a calling party directory telephone number with a corresponding name from terminating central office equipment.

2. Description of the Prior Art

Several Regional Bell Operating Companies are offering or planning to offer their customers Caller ID on a subscription basis. This new service discloses the calling party directory telephone number to the called party during the first long interval between ringing signals from a telephone switching office. Due to privacy considerations, most state Public Utility Commissions are requiring their local telephone companies to offer Caller ID along and for free, so as to allow the calling party to decide on a per call basis whether to disclose or block its directory telephone number to the called party. One blocking service being offered or considered by the Regional Bell Operating Companies requires the calling party to dial an access code prior to and as part of the calling sequence in order to override the calling party permanent "public" status of its directory telephone number and temporarily flag the directory telephone number as "private" to indicate to the terminating central office equipment that the directory telephone number is not to be disclosed to the called party. If the access code is dialed as part of the calling sequence, the directory telephone number will not be disclosed to the called party. In either case, the originating central office equipment transmits the flagged "public" or "private" directory telephone number to the terminating central office equipment to which the called party telephone line is connected during call setup. If the directory telephone number is flagged "private", the terminating central office equipment connects to the called party telephone line with ringing only. However, if the directory telephone number is flagged "public", the terminating central office equipment connects to the called party telephone line with ringing and the transmission of the calling party's directory telephone number.

The invention disclosed in the Carolyn A. Doughty U.S. Pat. No. 4,582,956, issued Apr. 15, 1986, discloses a method and an apparatus for displaying at a selected station special service information during a silent interval between ringing signals from a telephone switching office. Each received character of the special service information is "temporarily stored" in a data memory of a data receiver by a program-controlled microprocessor and then exhibited in a display unit under the control of the microprocessor. The display is thus initiated during the silent interval and remains until cleared, automatically, when the called party answers the incoming call or when the calling party hangs up. Thus, in either situation, the special service information is retained in memory at the terminating central office switch and not in a memory at the called party apparatus.

SUMMARY OF THE INVENTION

The foregoing problems are solved and a technical advance is achieved by method and apparatus for accessing telephone or cellular company originating central office equipment so as to control the disclosure of a calling party's DN to a called party who subscribes to Caller ID or to any of the previously mentioned CLASS services by performing different automatic calling operations. Another technical advance is achieved by method and apparatus for receiving, displaying and storing to memory a calling party's DN sent from telephone or cellular company terminating central office equipment responsively to the calling party's flagged "public" DN received to the terminating central office equipment from originating central office equipment to which the calling party telephone line is connected. A receiver-decoder connected to a called party apparatus (telephone set or separate stand alone unit) receives and decodes signals representing the calling party's DN sent from the terminating central office equipment. A number generator connected to the apparatus generates and assigns a numeric digit(s) to each DN received to the receiver-decoder. An alphanumeric display unit connected to the apparatus displays the received DN in an LED or LCD display. A memory unit of the apparatus stores the received DN and the generated digit(s) to memory for later recall and display. Still another technical advance is achieved by method and apparatus for recalling a stored DN from memory for visual display in a display, and for automatically or manually dialing the stored DN to return a missed call. For example, assuming that the called party missed the incoming call and decides to return the missed call, the called party presses a recall button on the apparatus to recall the stored DN from memory for display in the LED or LCD display. The called party then causes the apparatus to go into an off-hook mode so as to receive dial tone from central office equipment and then presses the digit(s) assigned to the stored DN on a keypad on the apparatus, thus an autodialer unit connected to the apparatus automatically dials the stored DN.

Still yet another technical advance is achieved by method for sending to a called station during a silent interval of a ringing signal cycle or a call-waiting tone signal cycle a calling party DN from terminating central office equipment responsively to the receipt of the DN from originating central office equipment indicating that the DN is to be disclosed at the called station. For example, the terminating central office equipment responds to the receipt of the calling party's "public" DN from the originating central office equipment by connecting to a voice channel of the called party busy or idle telephone line with a ringing signal or a call-waiting tone signal and then sending the DN to an apparatus at the called station during a silent interval of the ringing signal cycle or the call-waiting tone signal cycle.

In accordance with the teaching of this invention I provide a calling party with a programmable apparatus and methods of accessing telephone or cellular company originating central office equipment so as to control the disclosure of the calling party DN to a called party who subscribes to Caller ID or to any of the other CLASS services by performing different automatic calling operations. I also provide the called party with the programmable apparatus for use in receiving, displaying and storing to memory the calling party's DN sent from telephone or cellular company terminating central office equipment.

In one operation of this invention, i.e. in FIG. 1, the calling party programs the apparatus prior to going off-hook to perform a desired automatic calling operation by pressing either a display button or a block button on the apparatus, in addition to pressing a desired digit on the apparatus keypad corresponding to a stored phone number of a person to be contacted. The desired automatic calling operation begins when the calling party causes the apparatus to go into an off-hook mode. The telephone or cellular company originating central office equipment to which the calling party telephone line is connected, detects the off-hook condition on the telephone line and sends dial tone. A dial tone detector of the apparatus detects the dial tone while a microprocessor of the apparatus responsive to the detection of the dial tone, determines whether the display button or the block button has been activated. If neither the display button nor the block button has been activated, conventional automatic or manual dialing of the stored phone number or any other phone number prevails. Assuming that the display button and the digit corresponding to the stored phone number of the person to be contacted have, indeed, been activated, an autodialer with memory unit of the apparatus automatically dials the stored phone number. The originating central office equipment responds to the autodialed phone number by temporarily flagging the calling party permanent stored DN as "public" and automatically transmitting the flagged "public" DN to the terminating central office equipment to which the called party telephone line is connected. The terminating central office equipment responds to the receipt of the flagged "public" DN from the originating central office equipment by connecting to the called party idle or busy telephone line with ringing or call-waiting tone signals and transmitting the DN to the called party apparatus during a silent interval of the ringing or call-waiting tone signals. The apparatus receives the DN, generates and assigns a numeric digit to the received DN, displays the received DN in an LED or LCD display and stores the received DN to memory so as to allow the called party to later recall the stored DN from the memory for display and automatic or manual dialing of the stored DN to return a missed call.

In another operation of this invention, if it is determined that the block button has been activated, the autodialer with memory unit of the apparatus automatically dials a prestored access code. The access code instructs the originating central office equipment to which the calling party is connected, to temporarily flag the calling party permanent stored DN as "private". In continuance, the microprocessor of the apparatus immediately makes a decision to determine whether the digit corresponding to the stored phone number of the person to be contacted has been activated. Assuming that the digit has been activated, the autodialer with memory unite which is now in a pause mode, automatically dials the stored phone number. The originating central office equipment responds to the receipt of the autodialed phone number by temporarily flagging the calling party permanent stored DN as "private" and automatically transmitting the flagged "private" DN to the terminating central office equipment to which the called party telephone line is connected. The terminating central office equipment responds to the receipt of the flagged "private" DN from the originating central office equipment by connecting to the called party idle telephone line and transmitting ringing signals only, or by connecting to the called party busy telephone line and transmitting call-waiting tone signals only.

In still another operation of this invention, if it is determined that neither the display button nor the block but ton has been activated, conventional automatic or manual dialing of any access code and/or phone number prevails.

In still yet another operation of this invention, if it is determined that the display button has been activated and the digit corresponding to the stored phone number of the person to be contacted has not been activated, the calling party automatically or manually dials the stored phone number or any other desired phone number of the person to be contacted.

BRIEF DESCRIPTION OF THE DRAWINGS

The invention may be better understood from the following description when read together with the drawing, in which:

FIG. 2B shows, in flow chart form, method for automatically dialing a stored DN of a previous caller previously sent from terminating central office equipment responsively to the receipt of the DN from originating central office equipment.

DESCRIPTION OF THE PREFERRED
EMBODIMENT(S)

Figure 1:
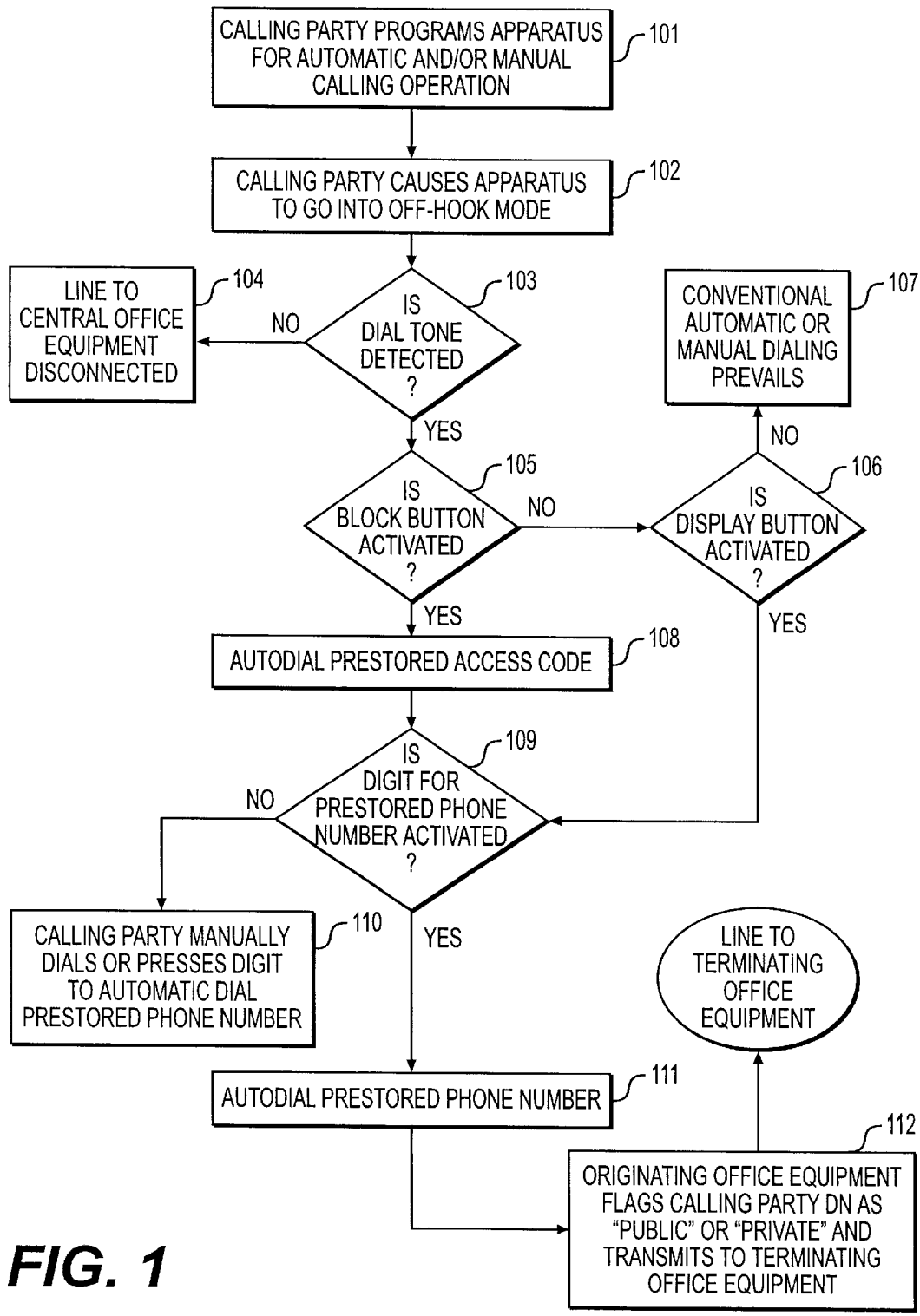
FIG. 1 shows, in flow chart form, method and apparatus for accessing originating central office equipment to control the disclosure of a calling party's DN to a called party who subscribes to Caller ID service or to any other CLASS service by performing different automatic or manual calling operations.

A first operation of the invention is illustrated in the flow chart of FIG. 1, which shows a calling party (step 101) programming its apparatus, while in an on-hook mode, to perform a desired automatic and/or manual calling operation by pressing either the block button or the display button on the apparatus plus a digit on the apparatus keypad corresponding to a prestored phone number of the person or entity to be contacted. The calling party (step 102) then causes the apparatus to go into an off-hook mode by either pressing a predetermined button on the apparatus or by lifting the handset on the apparatus. The originating central office equipment, prior art, responds to the off-hook condition on the calling party telephone line by sending dial tone. The dial tone detector (step 103), which is connected to the apparatus, detects the dial tone and signals the microprocessor (steps 105 and 106) which, in turn, determines whether the block button or the display button has been activated by the calling party (step 101). However, if the dial tone is not detected by the dial tone detector (step 103), it is presumed that the calling party apparatus is not connected via telephone lines to the originating central office equipment.

Assuming that the microprocessor (steps 105 and 106) determines that the block button has, indeed, been activated, the autodialer with memory unit (step 108), which is connected to the apparatus, automatically dials a prestored access code which instructs the originating central office equipment to temporarily flag the calling party permanent stored "public" DN as "private". The microprocessor (step 109) makes another decision, while the autodialer with memory unit (step 108) is in a pause mode, to determine whether the digit corresponding to the prestored phone number of the person or entity to be contacted has been activated. If it is determined that the digit has been activated, the autodialer with memory unit (step 111) is signalled to start dialing the prestored phone number. The originating central office equipment (step 112), prior art, responds to the receipt of the prestored access code and the autodialed phone number by flagging the calling party permanent stored "public" DN as "private" and transmitting the flagged "private" DN to the terminating central office equipment to which the called party telephone line is connected.

Referring now back to the microprocessor (steps 106 and 109), if it is determined that the display button and the digit corresponding to the prestored phone number have been activated, step 111 is the same as previously described. The originating central office equipment (step 112), prior art, responds to the receipt of the auto-dialed phone number by flagging the calling party permanent stored DN as "public" and transmitting the flagged "public" DN to the terminating central office equipment to which the called party telephone line is connected.

Referring now back to the microprocessor (steps 105 and 106), if it is determined that neither the block button nor the display button has been activated, the calling party (step 107) is permitted to conventionally dial, either automatically and/or manually, any access code and/or phone number of choice.

Referring now back to the microprocessor (steps 105, 106 and 109), if it is determined that the display button or the block button has been activated but the digit corresponding to the prestored phone number has not been activated, the calling party (step 110) is permitted to conventionally dial, either automatically or manually, the prestored phone number or any other phone number of choice.

Figure 2:
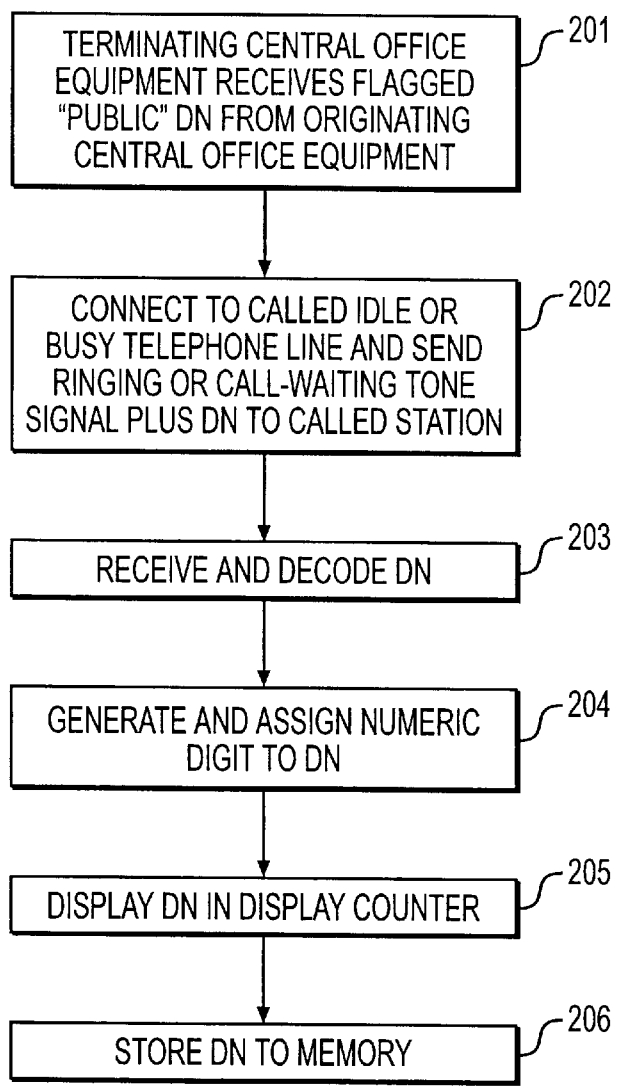
FIG. 2 shows, in flow chart form, method for sending via a voice channel of a busy or an idle telephone line to an apparatus at a called station a DN of a calling party from terminating central office equipment, and the apparatus receiving the DN, generating and assigning a numeric digit to the DN, displaying the DN in a display and storing the DN to memory.

In FIG. 2, the terminating central office equipment (step 201) to which a called party telephone line is connected, receives a calling party flagged "public" DN from originating central office equipment to which the calling party telephone line is connected.

The terminating central office equipment (step 202) responds to the receipt of a calling party flagged "public" DN from originating central office equipment to which the calling party telephone line is connected by connecting to a voice channel of a called party busy telephone line with call-waiting tone signals, and during a silent interval of the call-waiting tone signals sending the calling party DN to an apparatus at the called party station, or by connecting to a voice channel of a called party idle telephone line with ringing signals, and during a silent interval of the ringing signals sending the calling party DN to an apparatus at the called party station.

A receiver-decoder (step 203), connected to the called party apparatus (telephone set or separate stand alone unit), receives and decodes signals representing the calling party DN sent from the terminating central office equipment (step 202). A number generator (step 204), connected to the apparatus, generates and assigns a numeric digit or digits to each DN received to the receiver-decoder (step 203). An alphanumeric display unit (step 205), connected to the apparatus, displays the DN and its assigned numeric digit or digits in an LED or LCD display. A memory unit (step 206), connected to the apparatus, stores the DN and its assigned digit or digits to memory for later recall and display.

Figure 2A:
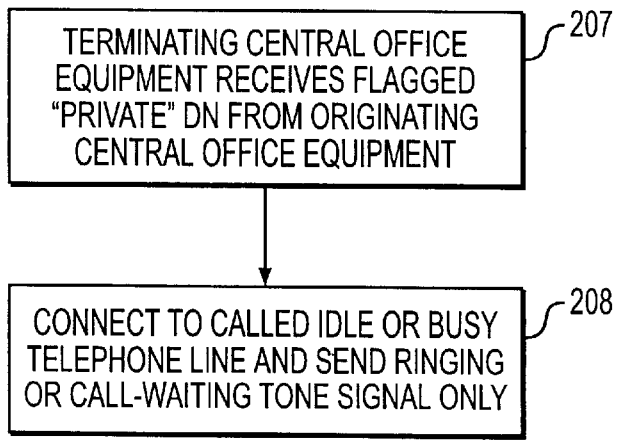
FIG. 2A shows, in flow chart form, method for sending via a voice channel of an idle or a busy telephone line to a called station ringing or call-waiting tone signals from terminating central office equipment responsively to a flagged "private" DN from originating central office equipment.

In FIG.2A, the terminating central office equipment (step 207) to which a called party telephone line is connected, receives a calling party flagged "private" DN from originating central office equipment to which the calling party telephone line is connected. The terminating central office equipment (step 208) responds to the receipt of the flagged "private" DN from the originating central office equipment by connecting to a voice channel of the called party busy telephone line with call-waiting tone signals only, or by connecting to a voice channel of the called party idle telephone line with ringing signals only.

In FIG. 2B, assuming that the called party missed the incoming call from the calling party and decides to return the missed call, the called party presses a recall button (step 209) on the apparatus to recall the stored DN from the memory unit (step 206 of FIG. 2) for display in the LED or LCD display (step 205 of FIG. 2). The called party (step 210) then causes the apparatus to go into an off-hook mode so as to receive dial tone from the originating central office equipment 301 of FIG. 3, and then presses the digit or digits assigned to the stored DN on a keypad (step 211) on the apparatus. An autodialer unit (step 212) of the apparatus responds to the digit or digits pressed on the keypad by automatically dialing the stored DN.

Figure 3:
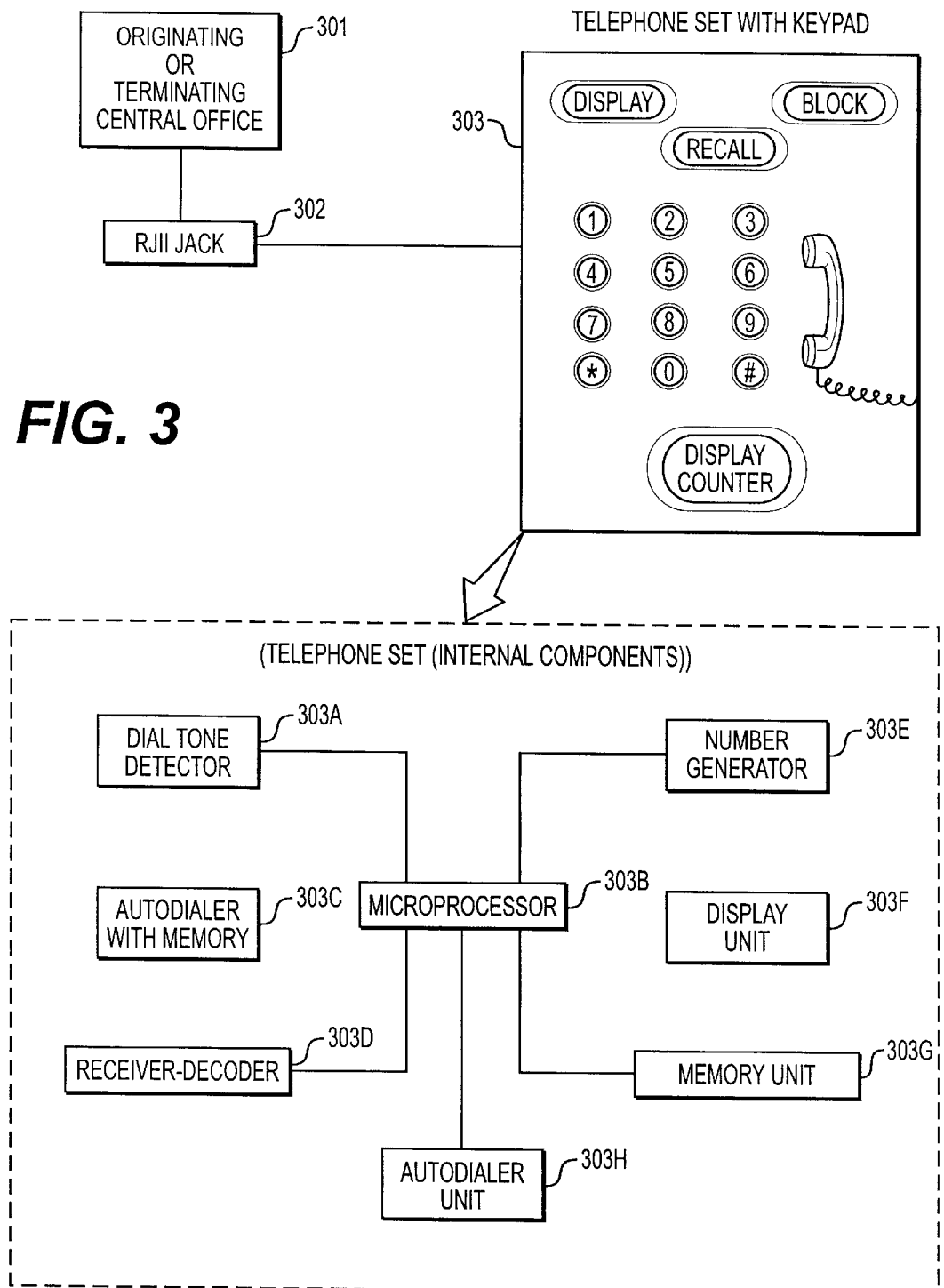
FIG. 3 shows a simplified diagram of the principal components of an apparatus (telephone set or other receiving and sending devices) connected via telephone lines and a RJ11 jack to originating or terminating central office equipment for performing the various operations of the invention.

In FIG. 3, is shown a simple block diagram configuration of the principal components (303A, 303B, 303C, 303D, 303E, 303F, 303G and 303H) of an apparatus 303 (telephone set or separate stand alone unit 303) connected via telephone lines and a RJ11 jack 302 to originating or terminating central office equipment 301.

Dial tone detector 303A is for detecting dial tone sent from originating central office equipment 301 responsively to an off-hook condition detected on the telephone line of apparatus 303.

Autodialer with memory unit 303C is for automatically dialing a prestored access code and/or a stored phone number.

Receiver-decoder 303D is for receiving and decoding signals representing a calling party's DN sent from terminating central office equipment 301 during a silent interval of a ringing or a call-waiting tone signal cycle.

Number generator 303E is for generating and assigning a numeric digit(s) to each DN received via receiver-decoder 303D.

Display unit 303F is for displaying in an LED or LCD display counter on apparatus 303 the DN received from terminating central office equipment 301 via receiver-decoder 303D, and for displaying in the LED or LCD display counter a stored DN when recalled from memory unit 303G.

Memory unit 303G is for storing to memory for later recall, display and automatic or manual dialing of the DN received from terminating central office equipment 301 via receiver-decoder 303D.

Autodialer unit 303H is for automatically dialing the stored DN in memory unit 303G.

Recall button on apparatus 303 is for initiating the recall of the stored DN from memory unit 303G for visual display in the LED or LCD display on apparatus 303.

Display button, block button and keypad on apparatus 303 are for enabling programming of the apparatus 303 on a per call basis to perform a desired automatic and/or manual calling operation.

Microprocessor 303B is for interacting with and controlling the above functions or functional devices by any known technique.

Originating central office equipment 301 is responsive to the receipt of an access code in conjunction with a dialed phone number of a called party for temporarily flagging a DN of a calling party "public" or "private" and then sending the flagged "public" or "private" DN to terminating central office equipment to which the person to be contacted telephone line is connected in the manner conventional for the Caller ID process. The originating central office equipment 301 is also for sending dial tone to a telephone station of a calling party in response to an off-hook condition detected on a telephone line of the telephone station.

Terminating central office equipment 301 is responsive to the receipt of a flagged "public" DN from originating central office equipment for connecting to a voice channel of a busy telephone line of a telephone station with a call-waiting tone signal and then transmitting the DN to an apparatus 303 at the telephone station during a silent interval of the call-waiting tone signal cycle, or for connecting to a voice channel of an idle telephone line of the telephone station with a ringing signal and then transmitting the DN to an apparatus 303 at the telephone station during a silent interval of the ringing signal cycle. Terminating central office equipment 301 is also responsive to the receipt of a flagged "private" DN from originating central office equipment for connecting to a voice channel a busy telephone line of a telephone station with a call-waiting tone signal only, or for connecting to a voice channel of an idle telephone line of a telephone station with a ringing signal only.

While the present invention has been described in connection with preferred embodiment (s) thereof, it is to be understood that additional embodiment (s), modifications and applications which will become obvious to those skilled in the art are included within the spirit and scope of the invention.

What is claimed is:

1. A method for sending to a called station of a first party who subscribes to a Custom Local Area Signaling System (CLASS) service such as Caller Identification (Caller ID) and who is engaged in a telephone conversation with a second party a directory telephone number with a corresponding name (DN) of a third party calling a telephone number of said first party, comprising the steps of:
   (a) in response to receiving at a terminating central office serving said first party who subscribes to said CLASS service such as Caller ID and who is engaged in said telephone conversation with said second party a public flagged DN of said third party from an originating central office of said third party, indicating that said DN of said third party is to be disclosed at said called station of said first party, connecting to a voice channel of said first party busy telephone line and sending a call waiting tone signal to said first party; and
   (b) said terminating central office then transmitting to said called station of said first party who subscribes to said CLASS service such as Caller ID and who is engaged in said telephone conversation with said second party said DN of said third party during a silent interval of said call waiting tone signal cycle.

2. The method as set forth in claim 1, further comprising the steps of:
   (c) receiving by an apparatus at said called station of said first party during said silent interval of said call waiting tone signal cycle said DN of said third party from said terminating central office;
   (d) generating and assigning a numeric digit to said received DN of said third party;
   (e) displaying said received DN of said third party on a display of said apparatus; and
   (f) storing said received DN of said third party in memory in conjunction with said assigned numeric digit.

3. A method as set forth in claim 1, wherein said terminating central office is telephone or cellular company terminating central office equipment.

4. A method as set forth in claim 1, wherein said first party who subscribes to said CLASS service such as Caller ID and who is engaged in said telephone conversation with said second party is a party being called by a calling third party.

5. A method as set forth in claim 2, wherein said apparatus is a pushbutton telephone or other receiving and sending equipment.

6. A method for disclosing to a first party engaged in a telephone conversation with a second party a directory telephone number (DN) of a third party calling a telephone number of said first party, comprising the steps of:
   (a) receiving at a terminating central office serving said first party a public flagged DN of said third party from an originating central office serving said third party;
   (b) said terminating central office responding to said public flagged DN of said third party from said originating central office, indicating that said DN of said third party is to be disclosed to said first party, by sending a call waiting tone signal to said first party;
   (c) said terminating central office then transmitting said DN of said third party to a telephone station apparatus of said first party during a silent interval of said call waiting tone signal cycle; and
   (d) said first party telephone station apparatus receiving said third party DN from said terminating central office during said silent interval of said call waiting tone signal cycle, generating and assigning an identifier to said received DN of said third party, displaying said received DN of said third party on a display of said apparatus, and storing said received DN of said third party in memory in conjunction with said assigned identifier.

7. A method as set forth in claim 6, wherein step (c) comprises the step of transmitting a corresponding name along with said DN of said third party.

8. A method as set forth in claim 6, wherein said first party telephone station apparatus is a cellular mobile phone.

9. A method as set forth in claim 6, wherein said third party's DN identifies a cellular mobile telephone.

10. A method as set forth in claim 6, wherein said identifier comprises a numeric digit.

11. A method as set forth in claim 6, wherein said terminating central office responding to said public flagged DN of said third party from said originating central office is telephone or cellular company terminating central office equipment.

12. A method as set forth in claim 6, wherein said first party telephone station apparatus is a pushbutton telephone or other receiving and sending equipment.

13. A method for automatically dialing at a telephone station a stored directory telephone number (DN) of a third party caller which was previously received from terminating central office equipment during a silent interval of a call waiting tone signal cycle, comprising the steps of:
- (a) recalling said stored DN of said third party from memory for visual display on an apparatus at said telephone station if a user presses a recall button on said apparatus;
- (b) responding to initiation of an off-hook condition at said telephone station to receive dial tone from originating central office equipment if the user causes the apparatus to go into an off-hook mode;
- (c) responding to said user pressing a digit on a keypad on said apparatus corresponding to an identifier assigned to said stored DN of said third party to initiate an automatic calling operation if the off-hook condition has occurred at said telephone station; and
- (d) automatically dialing said stored DN of said third party to return a missed call.

14. A method for receiving at a busy telephone station of a first party in conversation with a second party an incoming caller telephone directory number (DN) of a third party calling said first party, comprising the steps of:
- (a) receiving said DN of said third party from a terminating central office serving said busy telephone station;
- (b) generating and assigning an identifier to said received DN of said third party;
- (c) displaying said received DN of said third party in a display; and
- (d) storing said received DN of said third party in memory in conjunction with said assigned identifier.

15. A method as set forth in claim 14, wherein step (a) comprises the step of receiving a corresponding name along with said DN.

16. A method as set forth in claim 14, wherein said telephone station is a cellular mobile telephone.

17. A method as set forth in claim 14, wherein said third party's DN identifies a cellular mobile telephone.

18. A method as set forth in claim 14, wherein said identifier comprises a numeric digit.

19. A method as set forth in claim 14, wherein said DN is received during a silent interval of a call waiting tone signal sent from the terminating central office serving said busy telephone station of said first party.

20. Apparatus for receiving at a busy telephone station of a first party in conversation with a second party an incoming caller telephone directory number (DN) of a third party calling said first party, comprising:
- (a) means for receiving said DN of said third party from a terminating central office serving said busy telephone station;
- (b) means for generating and assigning an identifier to said received DN;
- (c) means for displaying said received DN of said third party in a display; and
- (d) means for storing said received DN of said third party in memory in conjunction with said assigned identifier.

* * * * *

UNITED STATES PATENT AND TRADEMARK OFFICE
CERTIFICATE OF CORRECTION

PATENT NO. : 6,427,009 B1
DATED : July 30, 2002
INVENTOR(S) : Morris Reese

It is certified that error appears in the above-identified patent and that said Letters Patent is hereby corrected as shown below:

Title page,
Item [56], U.S. PATENT DOCUMENTS,
Delete "5,263,084 A * 11/1993 Chaput et al. ..........379/215";

Column 7,
Lines 58 and 65, "such as" should be changed to -- including --;

Column 8,
Lines 8 and 28, "such as" should be changed to -- including --;
Line 30, "a calling" should be change to -- the calling --;

Column 9,
Line 28, insert -- the automatic calling operation including -- prior to "automatically".
Line 29, delete "to return a missed call";

Signed and Sealed this

Twenty-second Day of April, 2003

JAMES E. ROGAN
*Director of the United States Patent and Trademark Office*